INVENTOR.
JOHN H. CUTLER
ARMISTEAD L. WELLFORD
BY
THEIR ATTORNEY

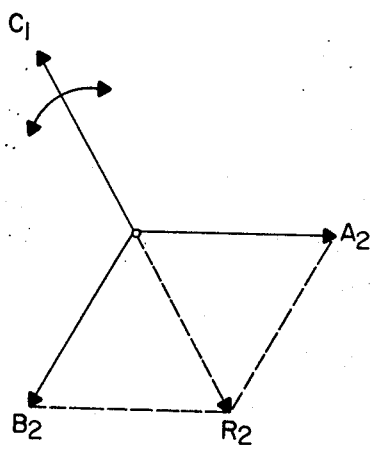
FIG. 2
FIG. 3
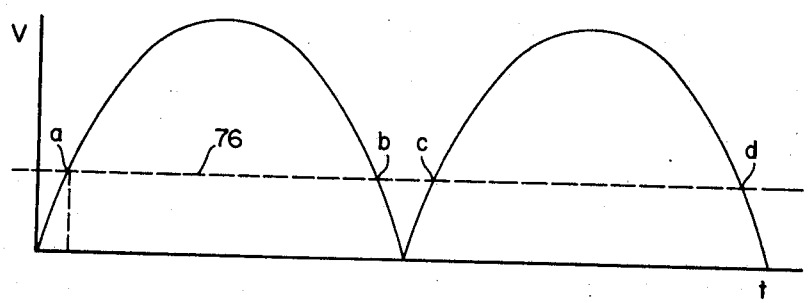

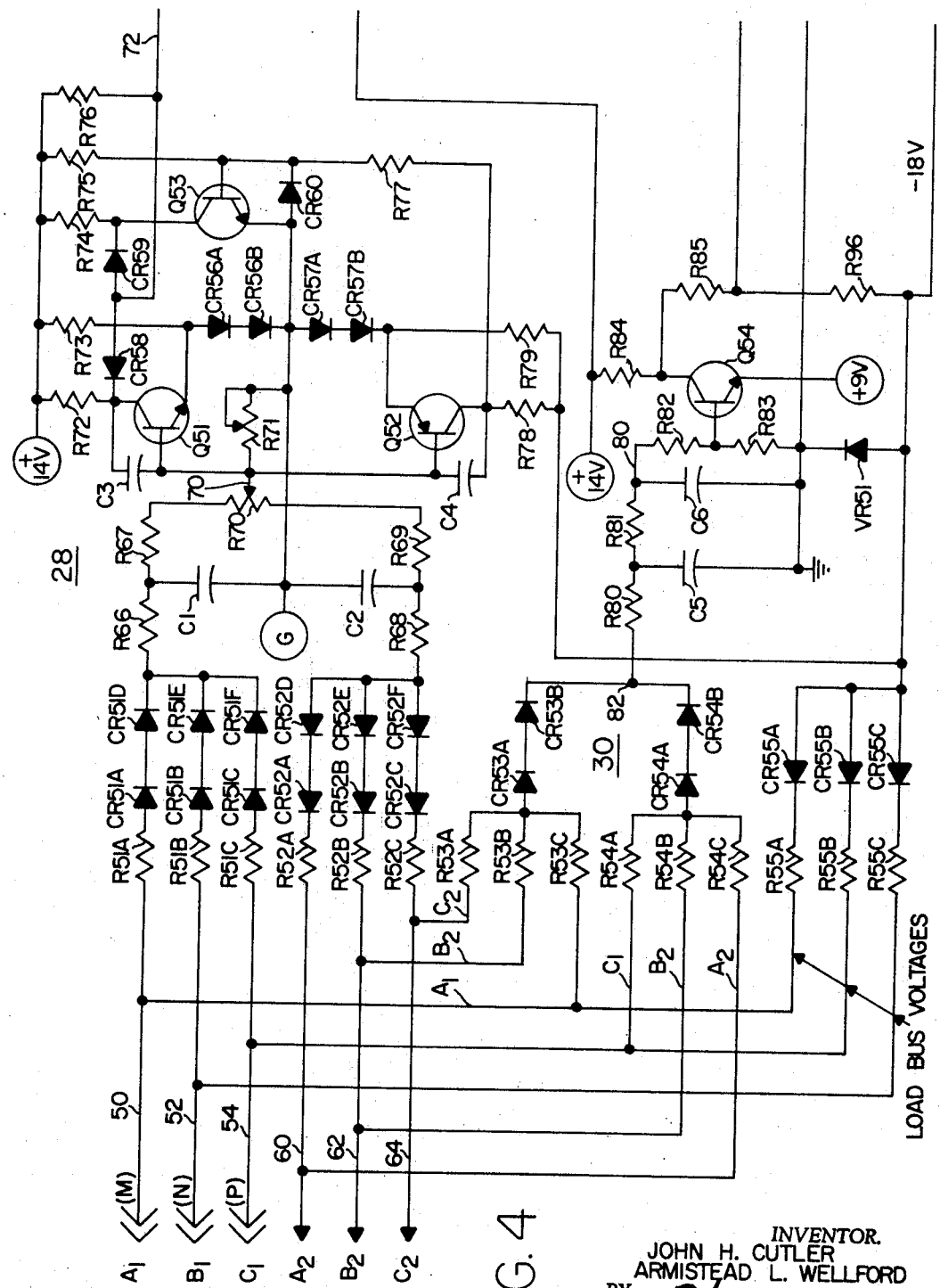
FIG. 4
INVENTOR.
JOHN H. CUTLER
ARMISTEAD L. WELLFORD
BY
THEIR ATTORNEY

United States Patent Office 3,493,778
Patented Feb. 3, 1970

3,493,778
APPARATUS FOR PARALLELING MULTI-PHASE AC VOLTAGES
John H. Cutler and Armistead L. Wellford, Waynesboro, Va., assignors to General Electric Company, a corporation of New York
Filed Mar. 27, 1968, Ser. No. 716,536
Int. Cl. H02j 3/08
U.S. Cl. 307—87                                    22 Claims

ABSTRACT OF THE DISCLOSURE

A system for paralleling two sets of three phase voltages detects when the sets are closely matched in voltage, frequency and phase. The frequency and phase differences are detected at different times, with the detected frequency being stored until phase difference is detected. In response to the phase difference moving out of the acceptable range, the stored frequency difference indication is removed and the system once again checks for the proper frequency difference. The frequency and phase detection circuitry operates in response to a generated waveform which contains frequency difference and phase difference information only if the phase sequence of the two sets is identical.

BACKGROUND OF THE INVENTION

When an alternating current generator is to be operated in parallel with one or more generators, the generators must be close to synchronism with each other when they are connected together, or when the incoming generator is connected to a line or bus to which the other generators are already connected. This means that the voltage, frequency and phase angle of the incoming generator and of the line must be close to the same values, within predetermined limits, in order to prevent excessive system transients, and so that the incoming generator will pull into synchronism with the line and operate properly in parallel with the other generators.

Sensing means are used for this purpose in applications such as in aircraft electrical system because of their high reliability under adverse environmental conditions and because they can be made quite small and light in weight. Automatic paralleling systems for controlling the generator breakers and switches have been used and are known in the prior art. Generally, the prior art systems include a sensing transformer connected to the corresponding phases of the incoming generator and of the line. The secondary voltage of the transformer is rectified and filtered to provide a pulsating voltage having maximum values when the generator and line are out of phase and minimum values when the generator and line are in phase, and having a frequency equal to the frequency difference between the generator and the line. The signal voltage is representative of the phase angle difference and the frequency difference between the generator and line and is used to actuate static control devices to provide an output voltage pulse when the incoming generator and the line are within the predetermined limits of the phase and frequency difference. The output voltage is then used to effect closing of the paralleling switches.

SUMMARY OF THE INVENTION

Output voltages are connected in parallel at times when the voltage, phase, and frequency characteristics are within close pre-established tolerances and when the phase sequence of each set is identical. The three phase voltages from each set are rectified, summed, and averaged, and the averages compared. If the two averages are within a predetermined tolerance a first condition output is generated indicating that the sets are within the proper voltage tolerance. Two of the phases of one set and the noncorresponding phase of the other set are summed to provide an envelope waveform having a frequency dependent upon the difference frequency and an amplitude dependent upon the instantaneous phase difference between the first and second sets. An identical envelope, generator, responsive to different phases of the sets, also provides an envelope having parameters proportional to phase difference and frequency difference. The two envelopes are substantially identical provided that the first and second sets to be paralleled have the same phase sequence. However, if the phase sequences differ, then the first and second envelopes will interfere and create an output which will not satisfy the frequency difference and phase difference detecting circuitry. The detecting circuitry responds to the envelope waveform and provides a first conditioning output indicating that the phase difference is within the predetermined tolerance when the envelope waveform is below a predetermined reference level. When the envelope waveform goes above the predetermined reference level a timer is initiated. The timer provides a time delayed trigger only when the frequency difference between the two sets is sufficiently low. The trigger then initiates a bistable circuit which provides the third conditioning output indicating that the frequency difference is sufficient. In the automatic mode, when all three conditioning outputs are in coincidence, a breaker is automatically closed thereby bringing the oncoming generator onto the line at a time when the oncoming generator is substantially equal in phase frequency and amplitude to the line voltages. Once the breaker is closed it locks in and the primary generator can then be switched out of the line. In the manual mode, the coincidence of the three conditioning outputs is used to energize a visual or audio alarm or indicator. When such indication occurs a monitor could then manually close the breaker. In the manual mode it is necessary to provide a reset means for turning off the indicator when the oncoming generator passes out of substantial synchronization with the on line voltages and for preparing the circuitry to re-examine for synchronization condition. When the phase difference exceeds the pre-established limits the phase conditioning output no longer exists thereby deenergizing the indicator. The removal of the phase conditioning output also operates to reset the bistable memory causing the detection circuitry to re-examine for frequency difference as well as phase difference and voltage amplitude difference.

BRIEF DESCRIPTION OF THE DRAWINGS

FIGURE 2 is a vector diagram illustrating the manner in which voltages are combined to form an envelope waveform.

FIGURE 3 is a voltage versus time graph showing an envelope waveform which is applied to the detecting circuitry of the present invention.

FIGURE 4 is a schematic diagram of a preferred embodiment of the present invention.

DETAILED DESCRIPTION OF THE PRESENT INVENTION

Figure 1:
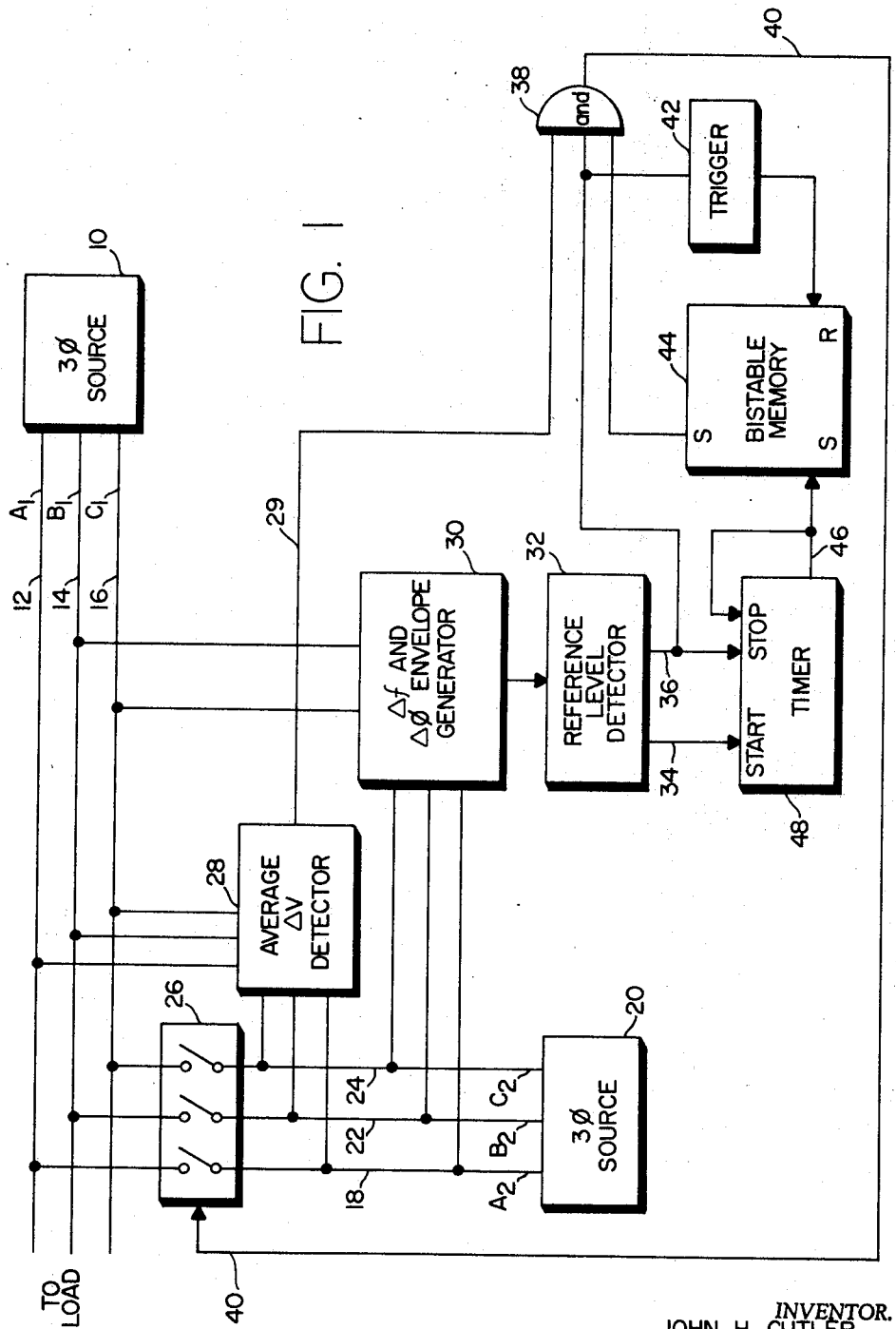
FIGURE 1 is a functional block diagram of a preferred embodiment of the present invention.

FIGURE 1 shows a three phase source 10 which provides three phase voltages via lines 12, 14 and 16 to a load. The phases of the voltages on lines 12, 14 and 16 are indicated as being $A_1$, $B_1$ and $C_1$ for purposes of indicating the phase sequence of the voltages. A second source of three phase voltages to be connected in parallel with the first group of three phase voltages is illustrated by the numeral 20 and provides the voltages on lines 18, 22, and 24. The latter lines contain the phases $A_2$, $B_2$, and $C_2$, respectively. The two sets of three phase voltages are connected in parallel by switching means 26 in response to an energizing signal on the switching control lead 40. Switching means capable of responding to voltage inputs are well known in the art and will not be described in detail herein. The remainder of the apparatus operates to generate an energizing voltage on lead 40 if and only if the following criteria are satisfied:

(1) The average voltage amplitudes of the two sets of three phase voltages are within a predetermined close tolerance;

(2) The frequencies of the two sets of voltages are sufficiently close;

(3) The instantaneous phase difference is below a predetermined minimum; and (4) The phase sequences are identical.

When an energizing voltage on lead 40 occurs it indicates that conditions are proper for closing breaker switch 26. In the automatic mode the energizing voltage on lead 40 closes a breaker 26 of the type which locks closed once energized. In the manual mode the energizing voltage on lead 40 energizes an indicator only during the time that the energizing voltage exists. During one of the times that the indicator (not shown) is energized, a monitor manually closes breaker switches 26.

The voltages from both sets are applied to an average voltage difference detector 28 which operates to rectify, average, and compare the averages of the two sets of voltages. If the average voltage difference is within the limit preset into detector 28, then a conditioning output appears on lead 29 causing one input to AND gate 38 to be energized.

Three phases of one of the voltage sets and two phases of the other voltage set are applied to a frequency difference and phase difference envelope generator 30 which operates to provide an envelope voltage output having a frequency dependent upon the frequency difference of the two sets and an instantaneous amplitude proportional to the instantaneous phase difference of the two sets provided that the two sets of voltages have the same phase sequence. If the voltage sets have different phase sequences the output waveform will not carry the proper phase difference and frequency difference information and will not operate the detection circuitry.

When the envelope voltage amplitude is below a reference level set into reference level detector 32, then the instantaneous phase difference between the two sets is small enough to allow paralleling, but when the envelope amplitude is above the reference level, the phase difference is not small enough to allow paralleling. Output terminal 34 is energized when the phase difference is outside of the preset limits and output lead 36 is energized when the phase difference is within the preset limits. Output lead 36 provides a second energized input to AND gate 38.

Since the time difference between the envelope waveform crossing the preset reference level in the positive direction and in a negative direction is a measure of the frequency difference of the two sets of voltages, the latter time is used to determine if the frequency difference is sufficiently low to allow paralleling. When the envelope waveform goes above the preset reference level in detector 32, output lead 34 starts a timer 48 which provides a trigger output via lead 46 after a predetermined period of time. If, however, the frequency difference of the two voltage sets is too great to allow paralleling, the envelope voltage amplitude will pass below the preset reference level causing an output on lead 36 prior to the time that timer 48 generates a trigger on lead 46. The output on lead 36, aside from indicating that the instantaneous phase difference is now sufficient, also stops timer 48 thereby preventing a trigger from occurring on lead 46. However, if the frequency difference is small enough, a trigger output on lead 46 will appear prior to the time that output lead 36 is energized thereby causing bistable memory 44 to be placed in the set condition. When in the condition caused by the trigger on lead 46, bistable memory 44 provides the third energized input to AND gate 38. The latter input indicates that the frequency difference is sufficient.

It will be noted that the sufficiency of the frequency difference cannot be detected during the time that output lead 36 indicates that the phase difference is sufficient. However, since bistable memory 44 holds the output indicating sufficient frequency difference, the frequency difference conditioning voltage applied to AND gate 38 can occur in coincidence with the phase difference conditioning voltage applied to AND gate 38. When all three inputs to AND gate 38 are energized it provides an output via lead 40 which closes switches 26. When any one of the inputs to AND gate 38 is not energized, the switches 26 will remain open and the two sources will not be connected in parallel.

When the output on lead 36, indicating phase difference sufficiency, drops below the level which energizes AND gate 38, a trigger circuit 42 provides a trigger output which resets bistable memory 44 thereby removing the energizing input on the lower lead of AND gate 38. Thus, the detection circuitry must re-establish the proper frequency difference sufficiency as well as the proper phase difference sufficiency before again energizing AND gate 38.

Figure 4A:
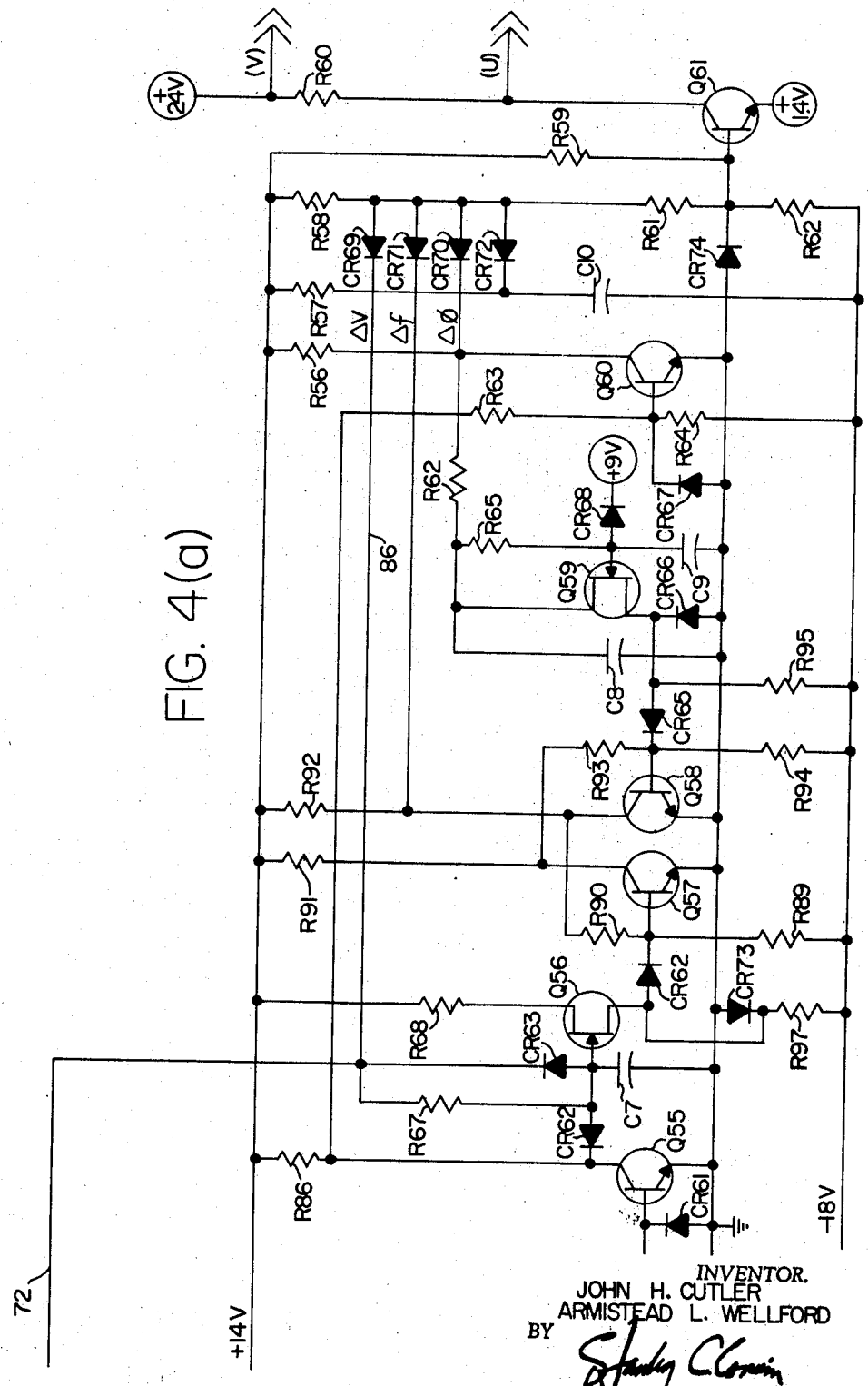
FIGURE 4a is a continuation from FIGURE 4 of the embodiment of FIGURE 4.

In the schematic drawing of FIGURE 4, the three lines 50, 52 and 54 are adapted to be connected to the respective phases $A_1$, $B_1$ and $C_1$ of the first set of three phase voltages, and the lines 60, 62 and 64 are adapted to be connected respectively to the A, B and C phases of the second set of three phase voltages. The first set of three phase voltages is rectified by diodes CR51 and the second set is rectified by diodes CR52. The two groups of diodes are in opposing directions thereby providing output voltages having opposite polarity with respect to ground line 66. The rectified voltages are filtered by R66, C1 and R68, C2 respectively. When the AC voltages of the two sets are equal, the voltage between point 68 and ground will be equal but opposite in the polarity to the voltage between point 69 and ground. Adjustment of the wiper 70 of resistor R70 provides a zero output voltage when the two sets are equal in AC voltage. When the AC voltages differ, the output on the wiper differs from ground potential by an amount which is dependent upon the difference voltage.

The voltage on wiper 70 is applied to the base terminals of transistors Q51 and Q52, each of which is shown as having their emitters connected to ground via a pair of diodes, CR56 and CR57, respectively. The collector of Q51 is connected via resistor R72 to a source of positive voltage and the collector of Q52 is connected via resistor R78 to a source of negative voltage. The emitter circuit diodes provide reference levels for the transistors Q51 and Q52. Thus, when the voltage on wiper 70 deviates from ground in the positive direction, it must overcome the forward voltage across diodes CR56 before causing transistor Q51 to conduct. Further adjustment in the reference level can be made by moving the wiper on resistor R71. Thus, if the difference in the AC voltages of the two sets are within the predetermined range set by diodes CR56, CR57 and resistor R71, then transistors Q51 and Q52 will be nonconducting. When both transistors are nonconducting, diodes CR58 and CR59 will be blocked causing output lead 72 of the average difference voltage detector 28 to carry a high voltage, substantially equal to the positive voltage supply, which is indicated as being 18 volts in the present example. However, if the AC voltage of the two sets differs by more than the predetermined amount, one of the transistors Q51 or Q52 will conduct. If transistor Q51 conducts, diode CR58 is forward biased causing output terminals 72 to be substantially at ground voltage through the collector emitter path of transistor Q51. If transistor Q52 is conducting, the base voltage of transistor Q53 will be increased causing that transistor to conduct and unblock diode CR59. The latter condition also places a substantial ground on output lead 72. Thus, the average voltage difference detector 28 operates to provide a high voltage on output terminal 72 when the difference is within the predetermined limits and a low voltage on output lead 72 when the difference is outside of the predetermined limit.

A preferred alternative arrangement to the one shown in FIGURE 4 is to remove the diodes from the emitter circuit of one of the transistors. In order to provide a proper reference level for the voltage difference, assuming the difference is in the direction to turn on the latter diode, the wiper of R70 is adjusted off center. Thus the voltage level provided by the diodes in one emitter circuit is divided between the two transistors.

In accordance with another alternative arrangement the terminals 68 and 69 are applied as inputs to a full wave rectifier, the output being a positive voltage proportional to the voltage difference. The latter voltage is then applied to a single normally nonconducting transistor via a potentiometer whose wiper is adjusted in accordance with the desired reference level.

The difference frequency and difference phase envelope generator 30 comprises a pair of phase adder and rectifier circuits and an envelope detector. The first phase adder and rectifier circuit comprises resistors R53 and diodes CR53, the second phase adder and rectifier circuit comprises resistors R54 and diodes CR54, and the envelope detector comprises the filter made up of resistors R80, R81 and capacitors C5 and C6. Either one of the phase adder and detector circuits acting alone is sufficient to generate an envelope having a frequency determined by the frequency difference of the two sets and instantaneous amplitude determined by an instantaneous phase difference. The use of two phase adder and rectifier circuits provides the added function, as will be explained in more detail hereafter, of insuring that the lines to be connected in parallel contain the same phase sequences.

The adder comprising resistors R54 adds two phases of the second set to a noncorresponding phase of the first set. Specifically, the A and B phases of set number two are added to the C phase of set number one. Referring to the phasor diagram of FIGURE 2, it can be seen that when phasors $A_2$ and $B_2$ are added, the resultant is $R_2$ which will be exactly opposite in phase to phasor $C_1$ when the two sets are operating instantaneously in phase. If the two sets of three phase voltages do not have the identical frequency, which is the case in all practical situations, phasor $C_1$ will rotate with respect to resultant $R_2$. Thus, the output of the R54 resistor connection will be a voltage having an envelope such as that indicated in FIGURE 3.

Assuming that the AC voltage amplitudes of the two sets are equal, the envelope reaches a node when C1 is 180° out of phase with $R_2$. The latter condition, as described above, occurs when the two sets are exactly in phase. Thus, whenever the envelope amplitude is below a predetermined reference level indicated by dashed line 76, the phase difference between the two sets is sufficient to allow paralleling. Also, since the period of the envelope waveform is inversely proportional to the difference frequency, the length of time between points *a* and *b* on the envelope waveform is greater for a smaller frequency difference. Thus, in the detector circuitry, to be described in more detail hereafter, the time between *a* and *b* is compared to a preset time difference to determine whether or not the frequency difference is within the pre-established limits.

As is well known in the art, when waveforms having different frequencies are added together the output will be a high frequency carrier having an envelope of the type indicated in FIGURE 3. Such a waveform, created by adding phasors $A_2$, $B_2$, and $C_1$, in resistors R54, is rectified by diodes CR54 and applied to the low pass filter comprising resistors R80, R81 and capacitors C5 and C6. The low pass filter operates to remove the high frequency carrier thereby providing the envelope waveform such as shown in FIGURE 3 at terminal 80.

As will be apparent from the above description, only one group of summation resistors, R54, is necessary to provide an envelope waveform which contains sufficient phase difference and frequency difference information to allow the detector to operate. However, a single group of summation resistors will provide the envelope waveform output irrespective of the phase sequences of the two sets. In other words, even though the phase sequences of sets 1 and 2 may not be identical, one set of summation resistors will provide a proper envelope waveform which will energize the detection circuitry. In order to prevent the latter situation, a second group of summation resistors R53 is included. In the second summation circuit, a different two phases of set number two are added to a noncorresponding phase of set number one. Specifically, in the examples shown, phases B and C of set number two are added to phase A of set number one. If the phase sequences of the two sets are identical, then the output envelope from the second summation network will be identical to the output envelope from the first summation network. However, if the phase sequences differ, the output envelopes from the two summation networks will be shifted in time with respect to one another and their sum which appears at point 82 will not contain any node points or any near node points. Effectively, if the phase sequences are identical, the waveform from the first summation network merely reinforces the waveform from the second summation network, but if the phase sequences are not identical, then the waveforms tend to overlap one another thereby preventing the frequency difference and phase difference detection circuitry from indicating that the frequency difference and phase difference are within the proper limits.

While not shown in FIGURE 4, three summation resistor networks can be used. The third network, in addition to R53 and R54 shown in the figure, could be connected to phases $B_1$, $A_2$, $C_2$ and its output added in to point 82. This additional summer would provide higher ripple frequency enabling less filtering.

The output from the detector circuitry is indicated by the output terminals V and U appearing across resistor R60 which is in series with the collector emitter path of transistor Q61. When transistor Q61 is conducting, the large voltage difference appearing across resistor R60 is sufficient to close the breaker switches or energize an indicator.

Conduction of transistor Q61 is controlled by diodes CR69, CR71, CR70 and CR72, which perform an AND function. When all of the diodes are blocked, current from the positive voltage supply passes through resistors R58 and R61 to turn on transistor Q61. When any of the diodes is not blocked, the current through R58 will pass through the unblocked diode thereby preventing conduction of transistor Q61, preventing the closure of the paralleling switch means.

Diode CR69 is the voltage difference diode and is blocked by a high voltage on lead 86, which is connected to lead 72. Thus, when the voltage difference between the two sets is within the present limit, diode CR69 will be blocked. Diode CR71 is the frequency difference diode and will be blocked if and only if the frequency difference is within the preset limits, and diode CR70, which is the phase difference diode, operates in the same manner in response to an indication that the phase difference is sufficient. The diode CR72 is added merely to prevent paralleling of the two sets when the detection circuitry is first turned on. After a short time delay, sufficient to allow the detection circuitry to become fully turned on, the capacitor C10 will be fully charged thereby maintaining diode CR72 blocked during the entire operation of the detection circuitry.

The blocking voltage for the voltage difference diode CR69 is generated by the difference voltage detector 28 in the manner described above. The circuitry for generating the blocking voltages for the difference frequency diode CR71 and the difference phase diode CR70 will now be described. Assuming that the input voltage at terminal 80 is the waveform shown in FIGURE 3, the circuitry operates to provide a blocking voltage to the phase difference diode CR70 whenever the envelope amplitude is below the reference level. Thus, during the time between $b$ and $c$, a blocking voltage for the phase difference diode is generated. On the other hand, the blocking voltage for the frequency difference diode CR71 is generated during the time between points $a$ and points $b$, when the envelope is above the reference level. Thus, the blocking voltage for the frequency difference diode is initiated only in the absence of the blocking voltage for the phase difference diode. However, the circuitry includes a bistable storage memory which stores the frequency difference blocking voltage and holds it during the time between $b$ and $c$ thereby allowing a coincidence of all the blocking voltages. Following time $c$, the phase difference blocking voltage is removed and a coincidence cannot occur at the diode AND gate until the phase difference is again within the present limit. In order to prevent a subsequent coincidence from occurring in the absence of a proper frequency difference, circuit means are provided for resetting the bistable memory when the phase difference blocking voltage is removed. Thus, at time $c$ when the phase difference blocking voltage is removed, the memory is reset to remove the frequency difference blocking voltage. The result is that the detection circuitry must again measure the envelope waveform to determine if the proper difference frequency still exists.

The waveform of FIGURE 3 appears at lead 80 and is reduced in value by resistors R82 and R83 so that the required phase difference corresponds to the 9V reference voltage which is applied to the emitter terminal of transistor Q54. When the envelope waveform is below the reference level, signifying that the phase difference is sufficient, transistor Q54 will be cut off, transistor Q55 will be turned on, and transistor Q60 will be turned off resulting in a high level voltage at the collector to transistor Q60 which blocks phase difference diode CR70. When the envelope is above the reference level, the latter three transistors are in the opposite states to those described above and phase difference diode CR70 is unblocked.

As the envelope waveform reaches point $a$, transistor Q54 turns on, and transistor Q55 turns off, allowing storage capacitor C7 to charge through resistor R87. As shown in FIGURE 4, capacitor C7 is charged by the high voltage appearing on terminal 72 only when the voltage difference is within the preset limits. The latter connection provides an additional safety means which prevents the indication of a proper frequency difference unless there is a proper voltage difference. However, the circuitry would also be suitable if resistor R87 was connected directly to the 18 volt positive supply thereby allowing capacitor C7 to charge every time that Q55 is turned off. When capacitor C7 charges to a high enough value to trigger the unijunction transistor Q56, a positive going trigger pulse is applied via diode CR64 to the base of transistor Q57 which forms part of the bistable memory circuit. If the envelope waveform reaches point $b$ prior to the time that the charge on capacitor C7 is sufficient to trigger unijunction transistor Q56, capacitor C7 will be discharged through transistor Q55 thereby preventing the bistable memory from being triggered. However, if the frequency difference as indicated by the time difference between $a$ and $b$ on the envelope waveform, is within the preset limit, the charge on capacitor C7 will build up to the triggering level prior to the time that transistor Q55 is turned on.

In the specific example shown in FIGURE 4 the charging voltage is controlled by the voltage difference and the charging time is controlled by the frequency difference. As pointed out above the charging voltage may be made independent of the voltage difference. An additional alternative would be to have the capacitor C7 circuit controlled as shown in FIGURE 4 but eliminate the voltage difference diode CR60 circuit. Thus rather than detecting the proper voltage difference at the diode AND gate, it would be detected in the capacitor charging circuitry.

Transistors Q57 and Q58 operate as a bistable memory device which is triggered into opposite states by positive going trigger pulses at the base terminals of the respective transistors. For reference purposes only, the bistable memory is said to be in the SET state when transistor Q57 is conducting and transistor Q58 is nonconducting, and in the RESET state when transistor Q57 is not conducting and transistor Q58 is conducting. When the positive trigger pulse is applied to the base of transistor Q57 the bistable memory switches to its SET state thereby providing a high voltage at the collector terminal of transistor Q58 which operates to block frequency difference diode CR71. As soon as the envelope waveform reaches point $b$, transistor Q60 will be turned off again causing the phase difference diode CR70 to be blocked. Under the latter conditions, all of the diodes forming the AND gate will be blocked resulting in transistor Q61 being turned on.

When the phase difference moves out of the acceptable range, as indicated by point $c$ on the waveform, transistor Q60 is once again turned on thereby removing the blocking voltage from the phase difference diode CR70. During the time that transistor Q60 was nonconducting, capacitor C9 charged to a relatively high voltage via resistors R62 and R65. As soon as transistor Q60 is turned on, the voltage between its collector and emitter is reduced substantially and this reduction in voltage is applied across the two bases of unijunction transistor Q59. At that instant, the voltage between the emitter and lower base of transistor Q59, which is applied thereto by capacitor C9, will be sufficient to trigger the unijunction transistor which in turn provides a positive trigger to the base of transistor Q58. The latter condition rests the bistable memory circuit and removes the blocking voltage from the frequency difference diode CR71.

It will be noted that the 18 volt negative supply is indicated in the drawing as being supplied by the three phase voltage lines 50, 52 and 54 via rectifiers CR55 and voltage limiting Zener diode VR51. It will be apparent to one of ordinary skill in the art that the positive voltage supplies shown may be derived in a similar manner from the three phase voltage lines.

While the invention has been particularly shown and described with reference to preferred embodiments thereof, it will be understood by those skilled in the art that various changes in form and details may be made therein without departing from the spirit and scope of the invention.

What is claimed as new and desired to be secured by Letters Patent of the United States is:

1. A system for use in paralleling first and second sets of AC voltages comprising
  (a) means for generating a first condition output voltage in response to said first and second sets of AC voltages having an average voltage difference within a preset range,
  (b) a bistable memory having a second condition output voltage when in a first stable state,
  (c) means for generating a third condition output voltage when the instantaneous phase difference between said two sets is within a preset range,
  (d) means for detecting, when initiated, the frequency difference between said sets and triggering said memory into said first stable state when the frequency difference is within a preset range, said means for detecting and triggering being initiated when said phase difference is above said preset range, (e) means responsive to the termination of said third condition output voltage for triggering said memory out of said first stable state, and (f) means for detecting coincidence of said first, second, and third condition output voltages.

2. A system as claimed in claim 1 wherein said means for generating a first condition output voltage comprises (a) means rectifying and averaging the positive half cycles of one of said sets of voltages, (b) means for rectifying and averaging the negative half cycles of the other of said sets of voltages, (c) first and second transistors, (d) means responsive to the outputs from said rectifying and averaging means for changing the conductive state of one of said transistors when the difference in magnitude of said oltputs exceeds a predetermined difference, one of said transistors being responsive when one of said voltage magnitudes is greater and the other being responsive when the other voltage magnitude is greater, and (e) an output line connected to said first and second transistors.

3. A system as claimed in claim 2 wherein said preset range is determined by voltage reference means connected to at least one of said transistors.

4. A system as claimed in claim 3 wherein said means for changing the conductive state of said transistors comprises a series resistance network connected between the outputs of said rectifying and averaging means and the bases of said transistors.

5. A system as claimed in claim 1 wherein said means for generating said third condition output comprises (a) an envelope generator responsive to said first and second sets of AC voltages for generating an envelope waveform having a frequency proportional to the frequency difference between said two sets and an instantaneous amplitude proportional to the instantaneous phase difference between said two sets, and (b) reference level detecting means for generating a bilevel output having a first level in response to said envelope being below a preset reference level and having a second level in response to said envelope being above said preset reference level.

6. A system as claimed in claim 5 wherein said sets of AC voltages are three phase voltages and the phases to be paralleled are referred to as corresponding phases of the two sets, said envelope generator comprising (a) summation means for summing two phases from one of said sets with a noncorresponding phase of the other of said sets, and (b) an envelope detector means connected to the output of said summation means for removing the high frequency component of the signal out of said summation means.

7. A system as claimed in claim 5 wherein said sets of AC voltages are three phase voltages and the phases to be paralleled are referred to as corresponding phases of the two sets, said envelope generator comprising (a) first summation means for summing two phases from said first set with a noncorresponding phase of said second set, (b) second summation means for summing two phases from said first set with a second noncorresponding phase of said second set, (c) means for rectifying and combining the outputs of said first and second summation means, and (d) a low pass filter connected to the output of said rectifying and combining means.

8. A system as claimed in claim 5 wherein said means for detecting and triggering comprises (a) time delay circuit for generating, when operative, a first trigger voltage a predetermined time after being initiated, (b) means responsive to the output from said reference level detecting means for initiating said time delay circuit when said output changes from a first level to a second level and rendering said time delay circuit inoperative when said output is at said first level, (c) means responsive to said first trigger voltage for triggering said bistable memory into said first stable state.

9. A system as claimed in claim 5 wherein said means for detecting and triggering comprises (a) a storage capacitor, (b) a charging circuit for said storage capacitor, (c) means for providing a discharge path in parallel with said capacitor in response to said first level of voltage output from said reference level detecting means, and (d) means responsive to the voltage across said capacitor reaching a predetermined reference level for generating a first trigger voltage for switching said bistable memory to said first stable state.

10. A system as claimed in claim 9 wherein said charging circuit comprises a source of charging voltage and means responsive to said first condition output voltage for providing a connection between said source and said capacitor.

11. A system as claimed in claim 9 wherein said sets of AC voltages are three phase voltages and the phases to be paralleled are referred to as corresponding phases of the two sets, said envelope generator comprising (a) first summation means for summing two phases from said first set with a noncorresponding phase of said second set, (b) second summation means for summing two phases from said first set with a second noncorresponding phase of said second set, (c) means for rectifying and combining the outputs of said first and second summation means, and (d) a low pass filter connected to the output of said rectifying and combining means.

12. A system as claimed in claim 11 wherein said means for generating a first condition output comprises (a) means for rectifying and averaging the positive half cycles of one of said sets of voltages, (b) means for rectifying and averaging the negative half cycles of the other of said sets of voltages, (c) first and second transistors, (d) means responsive to the outputs from said rectifying and averaging means for changing the conductive state of one of said transistors when the difference in magnitude of said outputs exceeds a predetermined difference, one of said transistors being responsive when one of said voltage magnitudes is greater and the other being responsive when the other voltage magnitude is greater, and (e) an output line connected to said first and second transistors.

13. A system as claimed in claim 12 wherein said charging circuit of said detecting and triggering means comprises a source of charging voltage connected to said storage capacitor by said output line.

14. A system as claimed in claim 12 wherein said preset range is determined by voltage reference means connected to at least one of said transistors.

15. A system as claimed in claim 14 wherein said means for changing the conductive state of said transistors comprises a series resistance network connected between the outputs of said rectifying and averaging means and the bases of said transistor.

16. A system as claimed in claim 11 wherein said means for triggering said memory out of said first stable state comprises, (a) a unijunction transistor having a pair of bases and an emitter, (b) a charging capacitor connected to the emitter of said unijunction transistor, (c) means for connecting said third condition output voltage across said unijunction transistor, and (d) means for connecting the output of said unijunction transistor to a triggering input of said bistable memory.

17. In a system for paralleling first and second sets of multiphase voltages having at least an AC voltage difference within a present range, a circuit for detecting when the voltage difference is within said range comprising:

(a) means for rectifying and averaging the positive half cycles of one of said sets of voltages, (b) means for rectifying and averaging the negative half cycles of the other of said sets of voltages, (c) first and second transistors, (d) means responsive to the outputs from said rectifying and averaging means for changing the conductive state of one of said transistors when the difference in magnitude of said outputs exceeds a predetermined difference, one of said transistors being responsive when one of said voltage magnitudes is greater and the other being responsive when the other voltage magnitude is greater, and (e) an output line connected to said first and second transistors.

18. In a system as claimed in claim 17, said means for changing the conductive state of said transistors when the difference magnitude of said outputs exceeds a predetermined difference comprising (a) a series resistance network connected between the outputs of said rectifying and averaging means, (b) means for connecting the bases of said transistors to a point on said series resistance network, (c) said point being substantially intermediate of the ends of said series resistive network, (d) means for providing a voltage reference connected to at least one of said transistors.

19. In a system as claimed in claim 18 said means for providing a voltage reference comprises at least one diode connected to have its forward direction in series with the forward direction of the base-emitter diode of the transistor which it is connected to.

20. A circuit for generating a single waveform having one parameter proportional to the phase difference and another proportional to the frequency difference of two sets of three phase voltages only when the phases A, B, and C of the first set of three phase voltages is in the same phase sequence as the phases A, B and C of the second set of three phase voltages comprising (a) first means for adding two phases of said first set with a first noncorresponding phase of said second set, (b) second means for adding two phases of said first set with a second noncorresponding phase of said second set, (c) means for rectifying and combining the sums formed by said first and second adding means, and (d) means for detecting the amplitude envelope of the output of said rectifying and combining means.

21. In a system for paralleling a first set of multi-phase voltages with a second set of multi-phase voltages, a circuit for providing first and second outputs respectively when the phase difference and frequency difference of said two sets are within predetermined limits comprising (a) means for generating an envelope waveform having a frequency proportional to the frequency difference between said two sets and an amplitude proportional to the instantaneous phase difference between said two sets, (b) means responsive to said envelope waveform for providing said first output only when said envelope amplitude is at a level caused by said phase difference being within the predetermined phase difference limit, (c) time delay means operative only during the absence of said first output for providing a trigger output a predetermined time after the termination of said first output, (d) bistable storage means for providing said second output when in a first stable state, said storage means comprising means responsive to said trigger output for switching said bistable storage means into said first stable state.

22. In a system as claimed in claim 21, said circuit further comprising means responsive to the termination of said first output for triggering said bistable storage means out of said first stable state.

References Cited

UNITED STATES PATENTS

| 3,069,555 | 12/1962 | Kessler | 307—87 |
| 3,210,556 | 10/1965 | Billings | 307—87 |
| 3,226,561 | 12/1965 | Taniai | 307—87 |

ROBERT K. SCHAEFER, Primary Examiner

H. J. HOHAUSER, Assistant Examiner